(12) United States Patent
Forbes et al.

(10) Patent No.: US 7,222,341 B2
(45) Date of Patent: May 22, 2007

(54) METHOD AND SYSTEM FOR PROCESSING SOFTWARE DEPENDENCIES IN MANAGEMENT OF SOFTWARE PACKAGES

(75) Inventors: Jonathan A. Forbes, Bellevue, WA (US); Jeremy D. Stone, Bellevue, WA (US); Srivatsan Parthasarathy, Issaquah, WA (US); Michael J. Toutonghi, Seattle, WA (US); Michael V. Sliger, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 508 days.

(21) Appl. No.: 10/071,526

(22) Filed: Feb. 8, 2002

(65) Prior Publication Data

US 2002/0144248 A1  Oct. 3, 2002

Related U.S. Application Data

(63) Continuation of application No. 09/099,570, filed on Jun. 19, 1998, now Pat. No. 6,381,742.

(51) Int. Cl.
*G06F 9/445* (2006.01)
*G06F 9/45* (2006.01)

(52) U.S. Cl. .................. 717/170; 717/169; 717/171; 717/176

(58) Field of Classification Search .............. 717/105, 717/168–178, 122, 106; 709/223, 221; 707/203; 700/79
See application file for complete search history.

(56) References Cited

U.S. PATENT DOCUMENTS

| 4,558,413 A | 12/1985 | Schmidt et al. ............. 707/203 |
| 4,796,181 A | 1/1989 | Wiedemer ..................... 705/52 |
| 4,953,209 A | 8/1990 | Ryder, Sr. et al. |
| 4,982,430 A | 1/1991 | Frezza et al. |
| 5,003,591 A | 3/1991 | Kauffman et al. |
| 5,047,928 A | 9/1991 | Wiedemer ..................... 705/52 |
| 5,142,680 A | 8/1992 | Ottman et al. ................ 717/11 |
| 5,155,484 A | 10/1992 | Chambers, IV .............. 341/55 |

(Continued)

FOREIGN PATENT DOCUMENTS

EP  0677809  10/1995

(Continued)

OTHER PUBLICATIONS

Gal et al., A multiagent update process in a database with temporal data dependencies and schema versioning, IEEE, vol. 10, Issue 1, Jan.-Feb. 1998 pp. 21-37.*

(Continued)

*Primary Examiner*—Wei Zhen
*Assistant Examiner*—Satish S. Rampuria
(74) *Attorney, Agent, or Firm*—Klarquist Sparkman, LLP

(57) ABSTRACT

A software package manager uses a distribution unit containing components for a software package and a manifest file that describes the distribution unit to manage the installation, execution, and uninstallation of software packages on a computer. Information in the manifest file pertaining to a software package is stored in a code store data structure upon installation of the package. The manifest file also contains information that permits the software package manager to resolve any software dependencies upon installation. The software package manager uses the code store data structure to locate the required components when the software is executed and to remove the components appropriately when the software is uninstalled.

21 Claims, 8 Drawing Sheets

U.S. PATENT DOCUMENTS

| | | | |
|---|---|---|---|
| 5,155,680 A | 10/1992 | Wiedemer | 717/11 |
| 5,155,847 A | 10/1992 | Kirouac et al. | 709/221 |
| 5,247,683 A | 9/1993 | Holmes et al. | 709/221 |
| 5,267,171 A | 11/1993 | Suzuki et al. | 700/234 |
| 5,337,360 A | 8/1994 | Fischer | 713/176 |
| 5,367,621 A | 11/1994 | Cohen et al. | |
| 5,367,686 A | 11/1994 | Fisher et al. | 717/11 |
| 5,388,211 A | 2/1995 | Hornbuckle | 717/11 |
| 5,390,247 A | 2/1995 | Fischer | 713/176 |
| 5,421,009 A | 5/1995 | Platt | 709/221 |
| 5,473,772 A | 12/1995 | Halliwell et al. | 717/11 |
| 5,493,682 A * | 2/1996 | Tyra et al. | 717/122 |
| 5,495,411 A | 2/1996 | Ananda | 705/32 |
| 5,496,177 A | 3/1996 | Collia et al. | 434/118 |
| 5,528,490 A | 6/1996 | Hill | 717/11 |
| 5,548,645 A | 8/1996 | Ananda | 705/52 |
| 5,555,416 A | 9/1996 | Owens et al. | 395/712 |
| 5,586,304 A * | 12/1996 | Stupek et al. | 717/170 |
| 5,586,322 A | 12/1996 | Beck et al. | 707/200 |
| 5,634,056 A * | 5/1997 | Casotto | 707/203 |
| 5,638,446 A | 6/1997 | Rubin | 705/51 |
| 5,654,746 A | 8/1997 | McMullan, Jr. et al. | |
| 5,654,901 A | 8/1997 | Boman | 717/11 |
| 5,678,002 A | 10/1997 | Fawcett et al. | 345/709 |
| 5,689,711 A * | 11/1997 | Bardasz et al. | 717/105 |
| 5,694,546 A | 12/1997 | Reisman | 705/26 |
| 5,701,451 A | 12/1997 | Rogers | 707/1 |
| 5,706,502 A | 1/1998 | Foley et al. | |
| 5,708,709 A | 1/1998 | Rose | 705/59 |
| 5,710,918 A | 1/1998 | Lagarde | 707/10 |
| 5,717,930 A | 2/1998 | Imai et al. | 717/11 |
| 5,721,824 A | 2/1998 | Taylor | 709/203 |
| 5,732,275 A | 3/1998 | Kullick et al. | 717/11 |
| 5,742,829 A * | 4/1998 | Davis et al. | 717/178 |
| 5,748,960 A | 5/1998 | Fischer | 709/316 |
| 5,761,499 A | 6/1998 | Sonderegger | |
| 5,764,992 A | 6/1998 | Kullick et al. | 717/11 |
| 5,781,707 A | 7/1998 | Kunz et al. | |
| 5,809,251 A * | 9/1998 | May et al. | 709/223 |
| 5,835,777 A | 11/1998 | Staelin | 395/712 |
| 5,835,911 A * | 11/1998 | Nakagawa et al. | 707/203 |
| 5,838,906 A | 11/1998 | Doyle et al. | 709/202 |
| 5,845,077 A | 12/1998 | Fawcett | 709/221 |
| 5,845,090 A | 12/1998 | Collins, III et al. | 709/221 |
| 5,860,012 A | 1/1999 | Luu | 395/712 |
| 5,862,362 A | 1/1999 | Somasegar et al. | |
| 5,881,236 A | 3/1999 | Dickey | 709/221 |
| 5,909,545 A | 6/1999 | Frese, II et al. | |
| 5,909,581 A | 6/1999 | Park | 717/11 |
| 5,913,040 A | 6/1999 | Rakavy et al. | 709/232 |
| 5,987,256 A * | 11/1999 | Wu et al. | 717/146 |
| 5,999,740 A * | 12/1999 | Rowley | 717/173 |
| 6,006,034 A | 12/1999 | Heath et al. | |
| 6,009,274 A | 12/1999 | Fletcher et al. | 717/11 |
| 6,016,520 A | 1/2000 | Facq et al. | 710/33 |
| 6,049,671 A | 4/2000 | Slivka et al. | 717/11 |
| 6,074,434 A | 6/2000 | Cole et al. | 717/11 |
| 6,091,411 A | 7/2000 | Straub et al. | |
| 6,125,388 A | 9/2000 | Reisman | |
| 6,151,643 A | 11/2000 | Cheng et al. | 710/36 |
| 6,240,360 B1 | 5/2001 | Phelan | |
| 6,247,128 B1 | 6/2001 | Fisher et al. | 713/100 |
| 6,269,473 B1* | 7/2001 | Freed et al. | 717/104 |
| 6,324,693 B1* | 11/2001 | Brodersen et al. | 717/177 |
| 6,332,217 B1* | 12/2001 | Hastings | 717/178 |
| 6,349,408 B1* | 2/2002 | Smith | 717/174 |
| 6,370,681 B1* | 4/2002 | Dellarocas et al. | 717/110 |
| 6,529,784 B1* | 3/2003 | Cantos et al. | 700/79 |
| 6,557,054 B2 | 4/2003 | Reisman | |
| 6,611,862 B2 | 8/2003 | Reisman | |
| 6,658,464 B2 | 12/2003 | Reisman | |
| 6,769,009 B1 | 7/2004 | Reisman | |
| 6,802,061 B1* | 10/2004 | Parthasarathy et al. | 717/173 |
| 2004/0015833 A1* | 1/2004 | Dellarocas et al. | 717/106 |
| 2004/0205171 A1* | 10/2004 | Nathan et al. | 709/221 |

FOREIGN PATENT DOCUMENTS

EP   0811942 A2   12/1997

OTHER PUBLICATIONS

Lucas et al., Managing software evolution through reuse contracts, IEEE, Mar. 1997 pp. 165-168.*
Gopal, Dynamic program slicing based on dependence relations, IEEE, Oct. 1991 pp. 191-200.*
Pei Wei, O'Reilly & Associates, "WWW Browsers: Extensibility Issues," *Stanford Computer Forum WWW Workshop*, 1 page, Sep. 20-21, 1994.
Pei Wei, O'Reilly & Associates, "Extensibility in WWW Browsers," *Stanford Computer Forum WWW Workshop*, 3 pages, Sep. 20-21, 1994.
Smalley, "Hermes Nears Finish Line; Bloodhound will be Part of Summer Debut," *PC Week*, vol. 11, No. 19, p. 31, May 16, 1994.
Williams, "Internet Component Download," http://msdn.microsoft.com/library/periodic/period96/component.htm, pp. 1-3, Summer 1996.
Rozenblit, "O, A&M Capabilities for Switching Software Management," *IEEE*, pp. 357-361, 1993.
Mori et al., "Superdistribution: The Concept and the Architecture," *The Transactions of the IEICE*, vol. E 73, No. 7, pp. 1133-1146, Jul. 1990.
Lichty, "Getting the Goods (FTP)," *America Online's Internet Windows Edition*, pp. 135-167, 170-178, 1994.
Lichty, "Computing," *The Official America Online for Macintosh Tour Guide*, Version 2.5, pp. 123-163, 1994.
"Mercury Operator's Log: Oct. 26-Dec. 1, 1994," http://www.usc.edu/dept/raiders/logs/alpha-log-941202-941224.html, Dec. 24, 1994.
Moore, "SMS Debut Draws Crowds, Queries; Corporate Role Remains Uncertain," *Computerworld*, vol. 28, No. 38, p. 14, Sep. 19, 1994.
Darrow et al., "Microsoft Debuts Low-Cost NT 3.5," *Computer Reseller News*, No. 596, pp. 1-2, Sep. 19, 1994.
"Extensibility and Mini Applications," http://www.viola.org/book/chp13.html, *Extensibility*, Ch. 13, 10 pages, prior to Dec. 12, 1996.
"The Viola Home Page," http://www.viola.org/, 1 page, prior to Dec. 12, 1996.
"Viola WWW Features List," http://www.viola.org/vwFeatures.html, 1 page, prior to Dec. 12, 1996.
"A Brief Overview of the Viola Engine, and its Applications," http://www.viola.org/violaIntro.html, 15 pages, Aug. 16, 1994.
"Viola in a Nutshell," http://www.viola.org/book/preface.html, 3 pages, prior to Dec. 12, 1996.
Flavin et al., "Management of Distributed Applications in Large Networks," *IEEE*, pp. 232-241, 1988.
Raggett et al., *HTML 3 Electronic Publishing on the World Wide Web*, Addison Wesley Longman, pp. 219-220, 228-241, Jun. 1996.
Balderston, "Oil Change Tops Off PC's with Automatic Software Updates," *InfoWorld*, vol. 18, No. 22, p. 50, May 27, 1996.
Branwyn, "Getting Started," Mosaic Quick Tour, Ventana Press, Inc., Chapel Hill, NC, pp. 11-26, 1994.
Schroeder et al., "Windows 95 Rushes the Net: Netscape, Microsoft, Others Release New Browsers," PC Week, vol. 12, No. 34, p. 11, Aug. 28, 1995.
Branwyn, Mosaic Quick Tour, Ventana Press, Inc., Chapel Hill, NC, pp. 104-112, 1994.
Wingfield, "Netscape Inks Pact with Sun, Macromedia," InfoWorld, vol. 17, No. 22, p. 16, May 29, 1995.
Walsh, *Foundations of Java Programming for the World Wide Web*, "Java in Action," pp. 127-169, 1996.
Walsh, *Foundations of Java Programming for the World Wide Web*, "Input/Output: Java Streams," pp. 569-605, 1996.

PR Newswire, "Product Briefing: CyberMedia Oil Change Software: How it Works," Gale Group, PR Newswire Association, Inc., p0514CLTU034, May 14, 1996.

Business Wire, "Cybermedia: Cybermedia announces beta availability of Oil Change Software," Gale Group, Business Wire, p06180186, 1 page, Jun. 18, 1996.

PR Newswire, "New Cybermedia Oil Change Software will keep Windows PC software up-to-date automatically," Gale Group, PR Newswire Association, Inc., p0514NYTU038, 1 page, May 14, 1996.

PR Newswire, "Position Briefing: Oil Change can lower both user and vendor tech support costs," Gale Group, PR Newswire Association, Inc., p514NYTU042, 1 page, May 14, 1996.

Hoff, A., et al., "Specification for the Open Software Description (OSD) Format," http://www.marimba, Marimba, Inc., pp. 1-12 (Aug. 1997).

Lebel-Fraser-Dagenais et al., LUDE, A Distributed Software Library, http://www.cs.ualbert.ca/operations/Doc/lude2/lude2.html (Oct. 1995).

U.S. Appl. No. 08/764,040, filed Dec. 12, 1996, Parthasarathy et al.

Raggett, "HyperText Markup Language Specification Version 3.0," Internet Draft, 190 pages (181 sheets), Mar. 28, 1995.

Williams et al., "The component object model," Dr. Dobbs Journal, vol. 1994, Issue S14, pp. 14-21, Jun. 1994.

Jaeger et al., "Preserving integrity in remote file location and retrieval," Proceedings of the Symposium on Network and Distributed System Security, pp. 53-63, Feb. 1996.

http://dbz.icequake.net/share/afs/pub/pc/hardware/sound/grav_ultrasound/gravis/doom/, "Index of /share/afs/pub/pc/hardware/sound/gravis_ultrasound/gravis/doom/," 1 page, showing Doom files of Sep. 1994.

"doomsession.txt," 2 pages, session capture of execution of doom.exe, constructed via deice from above Doom files of Sep. 1994.

Yoshizaki, "Appendix A—Manual for LHA Version 2.13," pp. A1-A16, Jul. 20, 1991.

Daniel L. Jenkins, http://groups.google.com/groups?q=faq+%22self+extracting+file%22&start=230&hl=en&lr=&ie=UTF-8&oe=UTF-8&scoring=d&selm=Czp23.zplG%40ns1.nodak.edu&rnum=233, "Re: how to run Doom?" alt.games.doom.newplayers, 1 page, Nov. 23, 1994.

* cited by examiner

METHOD AND SYSTEM FOR PROCESSING SOFTWARE DEPENDENCIES IN MANAGEMENT OF SOFTWARE PACKAGES

CROSS REFERENCE TO RELATED APPLICATION

This application is a continuation of Forbes et al., U.S. patent application Ser. No. 09/099,570, now U.S. Pat. No. 6,381,742, filed Jun. 19, 1998, entitled, "Software Package Management," which is hereby incorporated herein by reference.

This application is related to U.S. patent application Ser. No. 08/764,040, now abandoned, entitled AUTOMATIC SOFTWARE DOWNLOADING FROM A COMPUTER NETWORK, filed on Dec. 12, 1996, and assigned to the assignee of the present application.

COPYRIGHT NOTICE/PERMISSION

A portion of the disclosure of this patent document contains material subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1997, Microsoft Corporation, All Rights Reserved.

FIELD OF THE INVENTION

This invention relates generally to software distribution, and more particularly to the management of software packages after distribution.

BACKGROUND OF THE INVENTION

Historically, the primary medium for software distribution has been either the traditional floppy disk or the more recent compact disc (CD-ROM). However, more and more individuals are acquiring software by downloading it from remote server computers connected to the client computers through the Internet. Additionally, companies and organizations are distributing software to their users across their local area networks. The physical medium is the network cable itself and the supporting communication hardware, a fixed cost associated with the establishment of the network. Therefore, distributing and installing software over an existing network bypasses the cost overhead of producing CDs or floppy disks.

In addition, using the network as the distribution medium profoundly reduces the software's total cost of ownership to an extent that cannot be achieved by CDs or floppies even when the media cost almost nothing to manufacture. Software distribution via CDs and floppies obey the "pull" paradigm, where every action is user-initiated. Distribution over the network has the ability to apply a "push" paradigm which provides three main benefits.

First, the installation is "hands-free" in that the user does not have to manually install the software. Second, the software can be easily and timely upgraded from a designated location because the burden of upgrading is borne by the software itself. Third, because different types of computer hardware and operating systems can connect to a common network, software distributed over the network can be made to work across platforms or intelligent so that only the correct version of platform-specific software is pushed down to the user.

However, current methods of software distribution over a network do not fully exploit the benefits. Existing distribution of platform-specific, or "native code," software relies on installation file formats that are hard to create, not extensible, and specific to a particular operating system. Although most current software is written in modules, there is no current mechanism that handles the situation where one component in a software program requires the presence of another to operate. If a user downloads software from a Web page, the user may discover that the program requires an external library which necessitates another network session to download, assuming the user can find the right location, and then the user must manually install the library before installing the software.

Software programs written in the popular platform-independent Java (the platform-independent programming language from Sun Microsystems. Inc., Java is a trademark of Sun Microsystems. Inc.) language require that the Java classes be "packaged" for distribution but the package does not contain persistent information so once Java software is installed on a client computer, all information about it is lost. It is impossible to tell what the version number is, where it came from, or whom the author is. Additionally, the current network distribution methods make it difficult to digitally sign a Java package for security purposes.

More problems arise when a user wants to execute an application which depends on both native code components and Java components since the distribution methods are completely different. Finally, once the software is downloaded and successfully installed on the client computer, no mechanism exists to track all of the components so that older versions can be easily superceded when newer version are available or that all the related components can be readily uninstalled when necessary.

Therefore, there is a need for a software distribution and tracking mechanism that handles cross-platform software, specifies the component dependencies, and is applicable to both the older distribution media as well as to the network distribution paradigm.

SUMMARY OF THE INVENTION

The above-mentioned shortcomings, disadvantages and problems are addressed by the present invention, which will be understood by reading and studying the following specification.

A software package manager uses a distribution unit containing components for a software package and a manifest file that describes the distribution unit to manage the installation, execution, and uninstallation of software packages on a computer. For installation, the package manager acquires the manifest file and parses it to learn if the software package depends on any additional components. The package manager resolves any dependencies by acquiring a distribution unit containing the needed component and installs the dependency's distribution unit as described below. Because dependencies can be nested within dependencies, the package manager recursively processes all the dependencies before finishing the installation of the software package that depends upon the additional components.

The software package manager acquires the distribution unit and extracts the components in the distribution unit into a directory on the computer. The package manager causes the operating system of the computer to install the software.

The package manager then updates a code store data structure with information in the manifest file. The fields in the code store data structure contains such information as the name and version of the distribution unit, a list of the components and their location on the computer, and the source of the distribution unit. Additional fields in the code store data structure can also contain a component version, a component data type, and a digital signature if one was affixed to the distribution unit.

During the installation, the package manager can optionally scan the code store data structure to determine if a component to be installed already exists on the computer and updates the code store data structure with the location of the later version of the component.

When a user requests execution of software, the package manager uses the code store data structure to locate the appropriate components for the operating system to use. When the user requests the uninstallation of a software package, the package manager deletes the appropriate components from the computer and updates the code store data structure accordingly.

The manifest file and distribution unit optionally are combined into a distribution unit file.

The manifest file format is common across all types of code and operating systems and easily extended to embrace new code types are they arise. The manifest file and distribution unit can be stored on all types of media from traditional magnetic and optical disks to networked servers. The distribution units for dependencies do not have to reside on the same type of media as the distribution unit or the manifest file that refers to the dependency. More than one distribution unit can be resident in a distribution unit file and a distribution unit file can contain a mixture of distribution units containing different code types.

Thus, the software package manager, the manifest file, the distribution unit and the code store data structure of the present invention solve the problems with existing distribution mechanisms. The manifest file is not particular to a particular code type or operating system and allows for the specification of nested software dependencies. Because the manifest file contains the location of the distribution units for any dependencies, the software package manager can acquire and install the dependencies without requiring manual intervention by the user. Different types of distribution units can be mixed in a distribution unit file so that a single mechanism is used to acquire and install all types of code.

The code store data structure maintained by the software package manager contains information about the installed software such as version and installation location, and is used to resolve version discrepancies among software programs that share components. The code store data structure is used by the package manager to locate necessary component when the software is executed so that a component stored in one directory can be readily shared by software programs with components in different directories. Finally, the code store data structure eases the uninstallation process by centralizing all the information about installed components.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular Open Software Description implementation of the invention is described. Finally, in the fifth section, a conclusion of the detailed description is provided.

Hardware and Operating Environment

Figure 1:
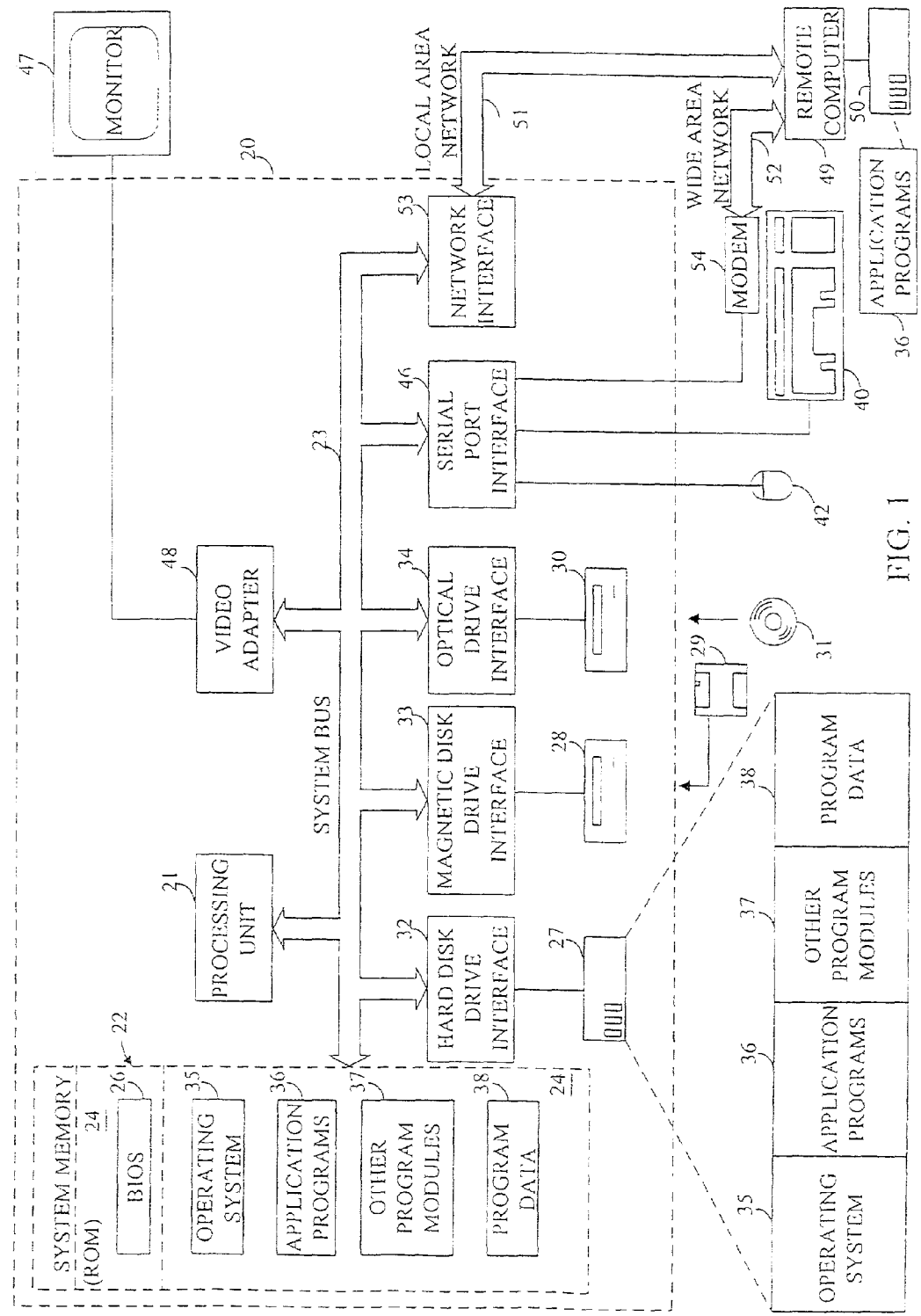
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Overview

A system level overview of the operation of an exemplary embodiment of the invention is described by reference to FIGS. 2A, 2B and 2C. The exemplary embodiment is implemented in a wide-area networking environment 52 having a server computer, such as remote computer 49 and a user or client computer, such as local computer 20, all of which are shown in FIG. 1 and described in the previous section.

Fred's Software Company has written a software package named "CoolestApp" that runs as a "plug-in application" in a World Wide Web browser, such as Microsoft Internet Explorer 4. A plug-in application is often employed to provide additional capabilities, such as multimedia or interactive controls, to browsers. One type of control application is that written to conform with Microsoft's ActiveX specifications. The plug-ins are usually written in object-oriented languages such as C++ or Java and are typically used on Web pages. The user may be prompted to download the plug-in or it may be automatically downloaded when needed.

Figure 2A:
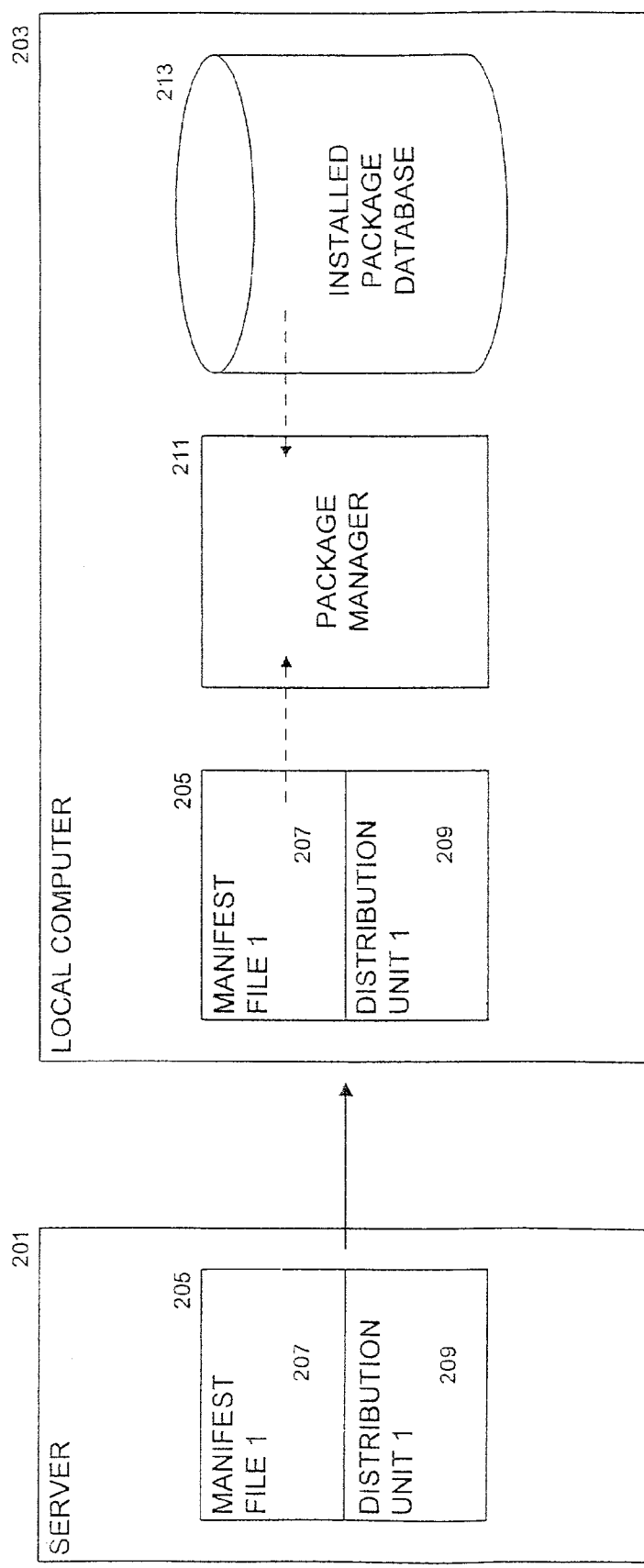
FIGS. 2A, 2B and 2C are diagrams illustrating a system-level overview of an exemplary embodiment of a package manager of the invention.
Figure 2B:
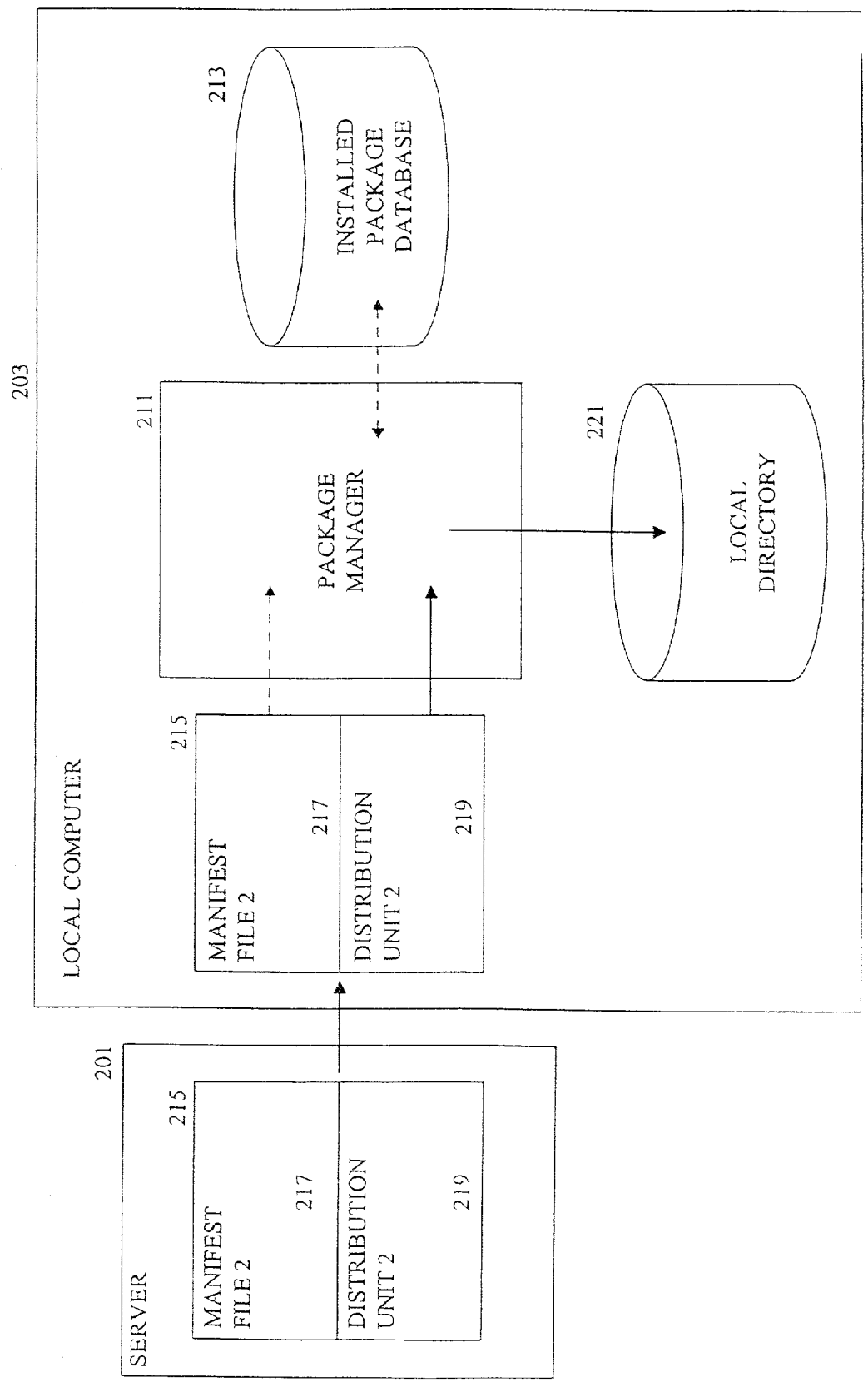

Referring to FIG. 2A, Fred's Software Company wants to distribute the CoolestApp over the Internet from Fred's Software Company's Web server 201 to a user's computer 203. Fred's Software Company logically groups the components for the CoolestApp together into a "distribution unit" 209. The components can include platform-specific compiled binary files such as dynamic linking library (.dll) files used by the Microsoft Windows family of operating systems, Java bytecode (.class) files, or files that contain optional installation instructions for how to use certain components contained in the distribution unit, for example, ActiveX controls may need to be registered before use. The distribution unit 209 can be a separate file or can be a portion of a "distribution unit file" 205 as explained below.

Fred's Software Company also creates a "manifest" file 207 describing the CoolestApp. The CoolestApp manifest file 207 contains information about CoolestApp, including the name of the CoolestApp distribution unit 209, the version number of the software package (all components in the distribution unit 209 have the same version number in this embodiment), and the operating systems under which the CoolestApp executes. Fred's Software Company bundles the CoolestApp distribution unit 209 and manifest file 207 into a distribution unit file 205 for storage on the server 201.

The names of other files in the distribution unit file 205, such as a text file containing licensing information or a "readme" file containing special instructions for the software package, are listed in the manifest file 207. The manifest file 207 also contains entries for software that is required to run CoolestApp but which is not included in the distribution unit file 205. Such required software represent "dependencies" and frequently include such items as language libraries and common object class libraries. A dependency can also be another software package. The manifest file 207 provides the ability to describe the software dependencies in a recursive tree format, also known as a "directed graph."

In the present example, CoolestApp is an enhanced version of a software program named "CoolApp" previously distributed by Fred's Software Company. Rather than completely rewriting CoolestApp, Fred's Software Company used the CoolApp components as a base and created additional components for the new features in CoolestApp. In the interest of minimizing download time, Fred's Software Company does not include the original components for CoolApp in the CoolestApp distribution unit 205. Instead Fred's Software Company inserts a dependency entry in the manifest file 205 which directs a user's browser to the location on Fred's Software Company server 201 holding the distribution unit file 215 for CoolApp as illustrated in FIG. 2B.

The browser begins the installation of the CoolestApp software package to the local computer by downloading the CoolestApp distribution unit file 205. A software package manager 211 running in the underlying operating system on the user's computer 203 extracts the manifest file 207 from the distribution unit file 209 and accesses an installed package database 213 to determine that Fred's Software Company's CoolestApp is not already installed. The dependency entry in CoolestApp manifest file 207 alerts the package manager 211 that the CoolestApp depends on Fred's Software Company's CoolApp. The package manager 211 determines that CoolApp has not been previously installed and directs the browser to download the CoolApp distribution unit file 215 from the server location specified in the dependency entry.

Once the CoolApp distribution unit file 215 has been downloaded to the user's computer 203, the package manager extracts the CoolApp manifest file 217 and determines that CoolApp does not have any dependencies. The package manager 211 creates a private directory 221 for Fred's Software Company applications, named FSC, extracts the CoolApp components from the distribution unit 219 into the FSC directory, and calls the underlying operating system installation facility to install the CoolApp components. The package manager 211 registers the CoolApp components in the installed package database 213 when the installation is successful.

Figure 2C:
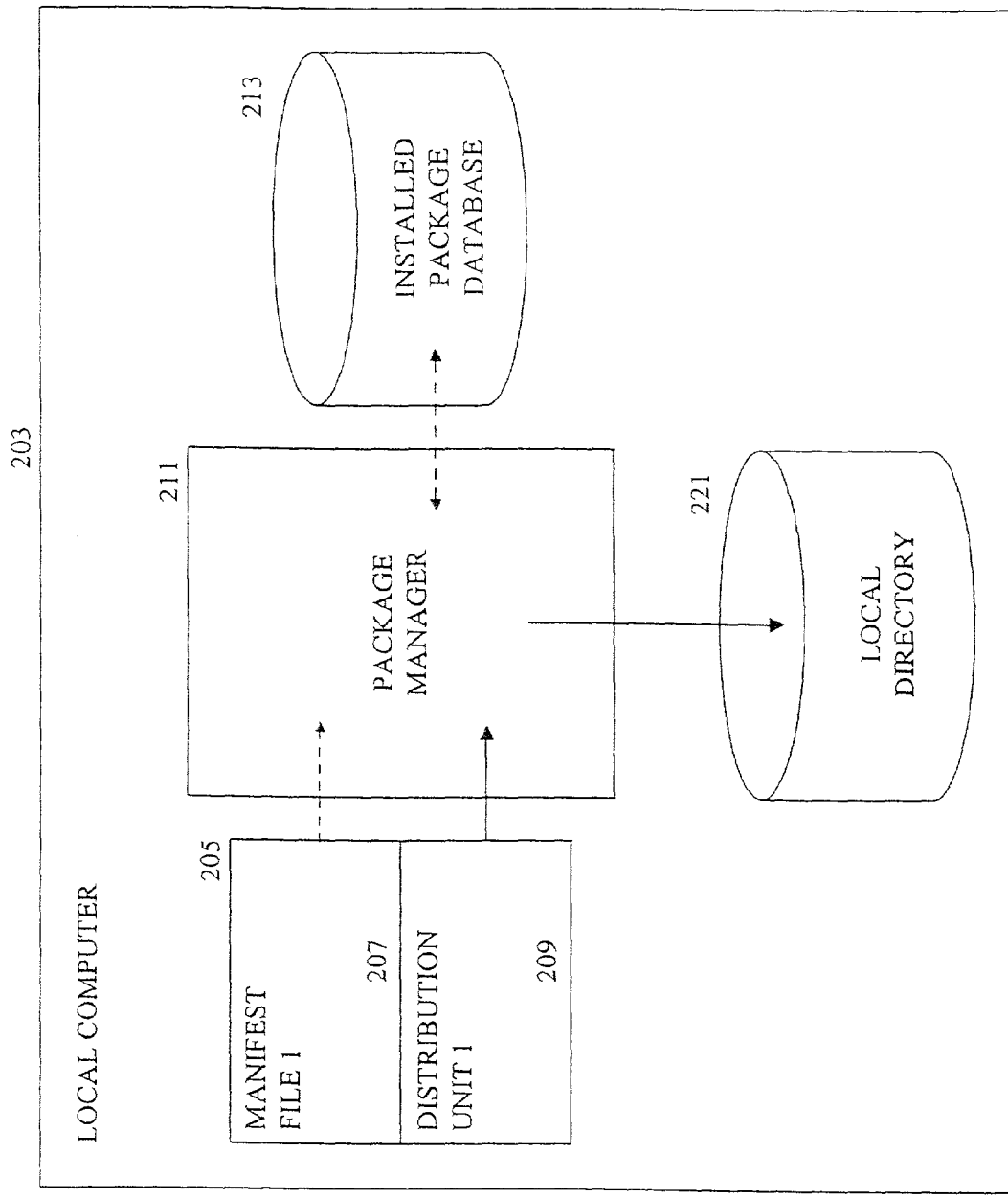

Referring to FIG. 2C, the package manager 213 extracts the CoolestApp components from the CoolestApp distribution unit 209 to the FSC directory 221, calls the installation facility, and registers the CoolestApp components in the installed package database 213. The browser now can run the CoolestApp helper application from the FSC directory 221.

If the user downloads additional Fred's Software Company applications that depend upon the components in either CoolApp or CoolestApp, the package manager 211 will use the already installed components to satisfy any dependencies that reference installed software package unless the additional applications require versions later than that installed.

If after running the CoolestApp helper application, the user decides that CoolestApp is not needed, the user employs the underlying operating systems uninstall facility to uninstall CoolestApp. The uninstall facility invokes the package manager 211 which determines if the CoolApp and CoolestApp components are being used by other applications and deletes the software packages from the FSC directory 221 if not. The package manager 211 also deletes the package entries from the installed package database 213 when the packages have been deleted from the FSC directory 221.

The system level overview of the operation of an exemplary embodiment of the invention has been described in this section of the detailed description. The package manager and its supporting files have been described in relation to installing a software package having a single dependency. While the invention is not limited to any particular distribution media, for sake of clarity a simplified version of Internet software distribution has been described.

Methods of an Exemplary Embodiment of the Invention

In the previous section, a system level overview of the operation of an exemplary embodiment of the invention was described. In this section, the particular methods performed by a client or local computer of such an exemplary embodiment are described by reference to a series of flowcharts. The methods to be performed by the client computer constitute computer programs made up of computer-executable instructions. Describing the methods by reference to a flowchart enables one skilled in the art to develop such programs including such instructions to carry out the methods on suitable computerized clients (the processor of the clients executing the instructions from computer-readable media).

The software package manager of the present invention is described as providing three major functions to the runtime environment of the local computer on which it runs as illustrated in FIGS. 3A–3D. It manages the installation of software packages, it locates necessary components when software is executed, and it supports the uninstallation of software. The package manager uses the installed package database, also called a "code store" data structure, to track components of software packages that have been installed on the local computer. One of skill in the art will, upon reading the following description of the code store data structure, recognize that any type of organized data structure, including various type of data bases, is suitable for use with the package manager.

As in the exemplary embodiment described in the previous section, the manifest file contains dependency entries specifying locations of distribution units containing required software components. The distribution unit file is suitable for distributing software packages on traditional media, such as CD-ROM or floppy disk, as well as over a wide area network, such as the Internet. The package manager extracts the manifest file and the distribution unit from the distribution unit file. In an alternate embodiment, the distribution unit and the manifest file can be stored separately on a network and the manifest file contains the network location of its corresponding distribution unit.

Installation

Figure 3A:
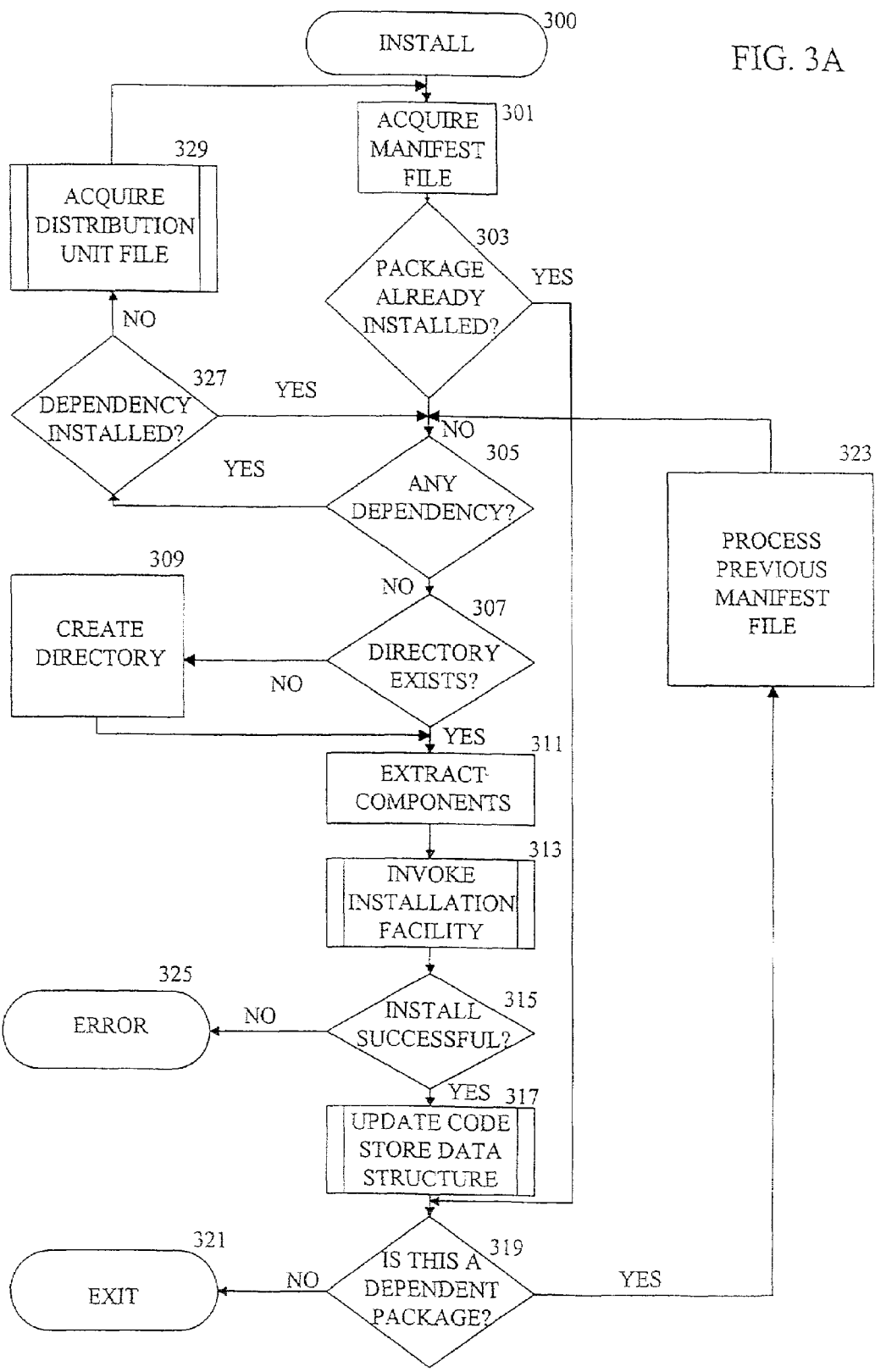
FIGS. 3A, 3B, 3C and 3D are flowcharts of methods to be performed by a client according to an exemplary embodiment of the package manager of the invention.
Figure 3B:
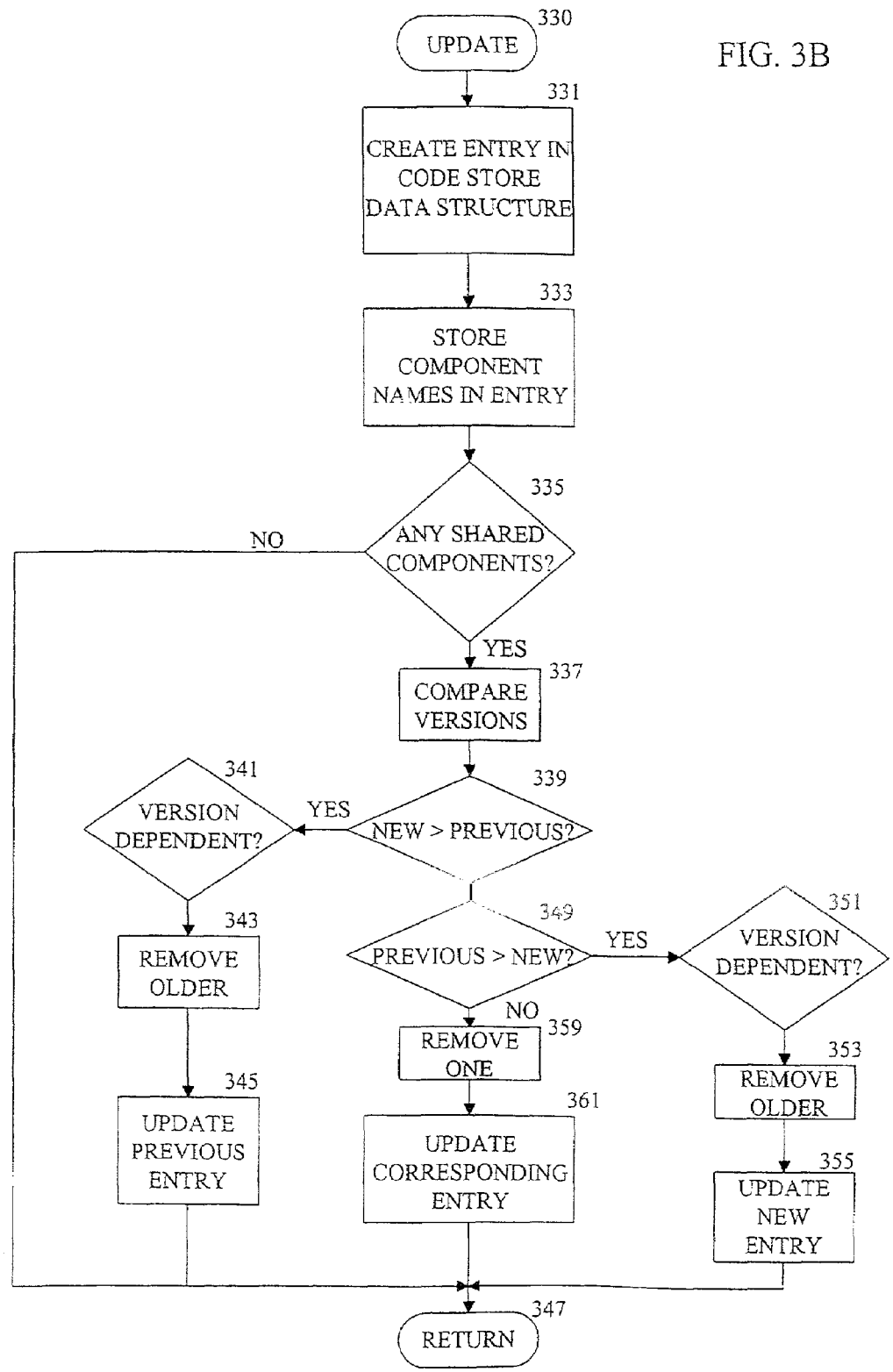

Referring first to FIGS. 3A and 3B, a flowchart of methods to be performed by a client according to an exemplary embodiment of the invention when installing new software is shown. This method is inclusive of the steps or acts required to be taken by the package manager.

When the distribution unit file for a software package is loaded onto a computer for installation, the software package manager running in the computer acquires the manifest file for processing (step 301). In an embodiment in which the manifest file is distributed in a distribution unit file, the package manager acquires the distribution unit file and extracts the manifest file from the distribution unit file. The package manager checks the name and version of the software package contained in the manifest file against the code store data structure to determine if the software package has already been installed (step 303). If so, the package manager exits (step 321).

If the software package is not installed, the package manager checks the manifest file to determine if the software package requires the installation of other software components (dependencies) not supplied as part of the distribution file unit (step 305) before installing the software package from the distribution unit. Such is frequently the case when a software package is written in a common programming language such as Java or C++ which depend on object class or language libraries being present.

If there are dependencies, the package manager checks the code store data structure to determine if the dependencies are installed on the local computer (step 327). If not, the package manager uses information stored in the manifest file about the dependencies to locate a source for the dependencies. The package manager then acquires a dependency from the source specified in the manifest file (step 329). In one embodiment, the source is a remote server designated by a uniform resource locator (URL) path name. In an alternate embodiment, the source is a server on a local area network and the path name is a network drive.

After acquiring the dependency from the source, the package manager installs the dependent software components on the local computer. The installation of the dependent components is identical to the installation process for the original software package which will be described in detail below in conjunction with steps 307 through 325. Because each dependency can itself include dependencies, the package manager will install all the nested dependencies prior to finishing the installation of the original software package.

Once all the dependencies are installed, the package manager determines if a directory for the software package exists (step 307) and creates one if it does not (step 309). The package manager assigns the directory a unique name that has a high probability of being different for every computer on which the software package is installed. In one embodiment, the unique name is generated using a standard hashing algorithm having the software package name as input.

The package manager extracts the components for the software package from the distribution unit file into the directory (step 311). In one embodiment, the components are gathered into an uncompressed "zip" formatted data file which contains a directory of the files within it. Other embodiments which use similar file structures to group the components together with a directory structure will be readily apparent to one skilled in the art. The package manager then invokes the installation facility provided by the operating system to install the components (step 313).

When the installation is successful (step 315), the package manager updates the code store data structure with the information contained in the manifest file (step 317 and FIG. 3B).

The package manager creates an entry in the code store data structure for the software package that includes the name of the software package, the version number, and the name of the directory (step 331). The names of the components in the software package are stored in the corresponding software package entry in code store data structure (step 333).

In one alternate embodiment shown in FIG. 3B, as part of the update process for the code store data structure, the package manager scans the code store data structure to determine if any of the components in the software package are shared with other software packages registered in the code store data structure (step 335). If so, the package manager performs one of three basic actions depending on the version information stored in the code store data base entries for the component (step 337).

If the newly stored component is a newer version of the previously stored component (step 339) and the code store data structure entry for the previously installed software package that references the older version does not indicate it is version dependent (step 341), the package manager removes the older version from the directory in which it is stored (step 343) and updates the code store data structure entry for the previously installed software package to point to the newer version (step 345). If there is a version dependency noted, the package manager leaves the older version in the directory (step 347).

If the newly stored component is older than the previously stored component (step 349) and the software package does not indicate a version dependency (step 351), the package manager removes the older version from the newly created directory (step 353) and updates the code store data structure entry for the newly installed software package to point to the newer version (step 355). As before, if there is a version dependency noted, the package manager does nothing to the older version (step 347).

If the components are the same version, the package manager chooses one to remove from its directory (step 359) and updates the corresponding entry to point to the other component (step 361).

In the embodiment in which the components are stored in an uncompressed zip file, or the like, the package manager uses the file directory to find the component to be deleted within the file in the appropriate directory. The package manager can, alternately, actually delete the component from the file and update the file directory or mark the component entry in the file directory as deleted depending on the particular file structure employed to hold the components.

In an alternate embodiment, the package manager does not attempt to determine if there are mismatched versions installed and each software package uses the version of the component that is indicated by its entry in the code store data structure.

Execution

Figure 3C:
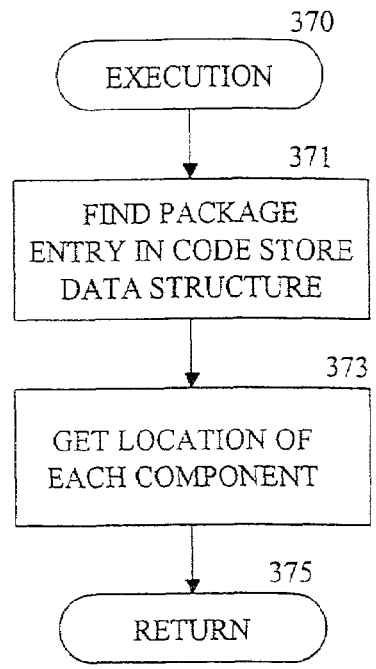

Referring next to FIG. 3C, a flowchart of a method to be performed by a client computer according to an exemplary embodiment of the invention when a software package registered through the package manager is executed in the runtime environment is shown. This method is inclusive of the steps or acts required to be taken by the software package manager.

When the user requests execution of the software package, the runtime environment invokes the package manager (step 370) to locate the components necessary to run the software. The package manager matches the software package name to the corresponding entry in the code store data structure (step 371) to determine the directory, or directories, holding the components (step 373). In the embodiment in which the components are stored in an uncompressed zip file, or the like, the package manager uses the directory to find the particular components within the file. The package manager returns the location of the components to the runtime environment (step 375).

Uninstall

Figure 3D:
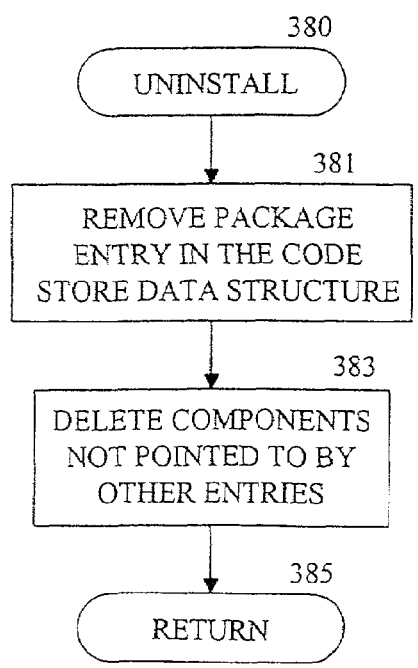

Finally, referring to FIG. 3D, a flowchart of a method to be performed by a client computer according to an exemplary embodiment of the invention when a software package registered through the package manager is uninstalled is shown. This method is inclusive of the steps or acts required to be taken by the software package manager.

When the user wants to uninstall a software package from the local computer, a standard uninstall routine provided by the runtime environment invokes the package manager to update the code store data structure accordingly (step 380). The package manager removes the corresponding software package entry in the code store data structure (step 381). The package manager does not delete a component from the directory unless no other installed software package references it (step 383).

In one embodiment, the package manager scans every entry in the code store data structure to determine if another entry for another software package references the local directory holding the component in question. In a first alternate embodiment, the package manager creates and maintains a tree structure of all shared components, so it can quickly determine if the component is shared with another software package. In a second alternate embodiment, the component is not deleted at the time the software package is uninstalled but instead a "garbage collection" routine is periodically run by the package manager. The garbage collection routine uses the code store data structure to determine if a component is referenced by any of the software packages installed on the local computer. Those components which are not referenced are then deleted.

Code Store Data Structure

Figure 4:
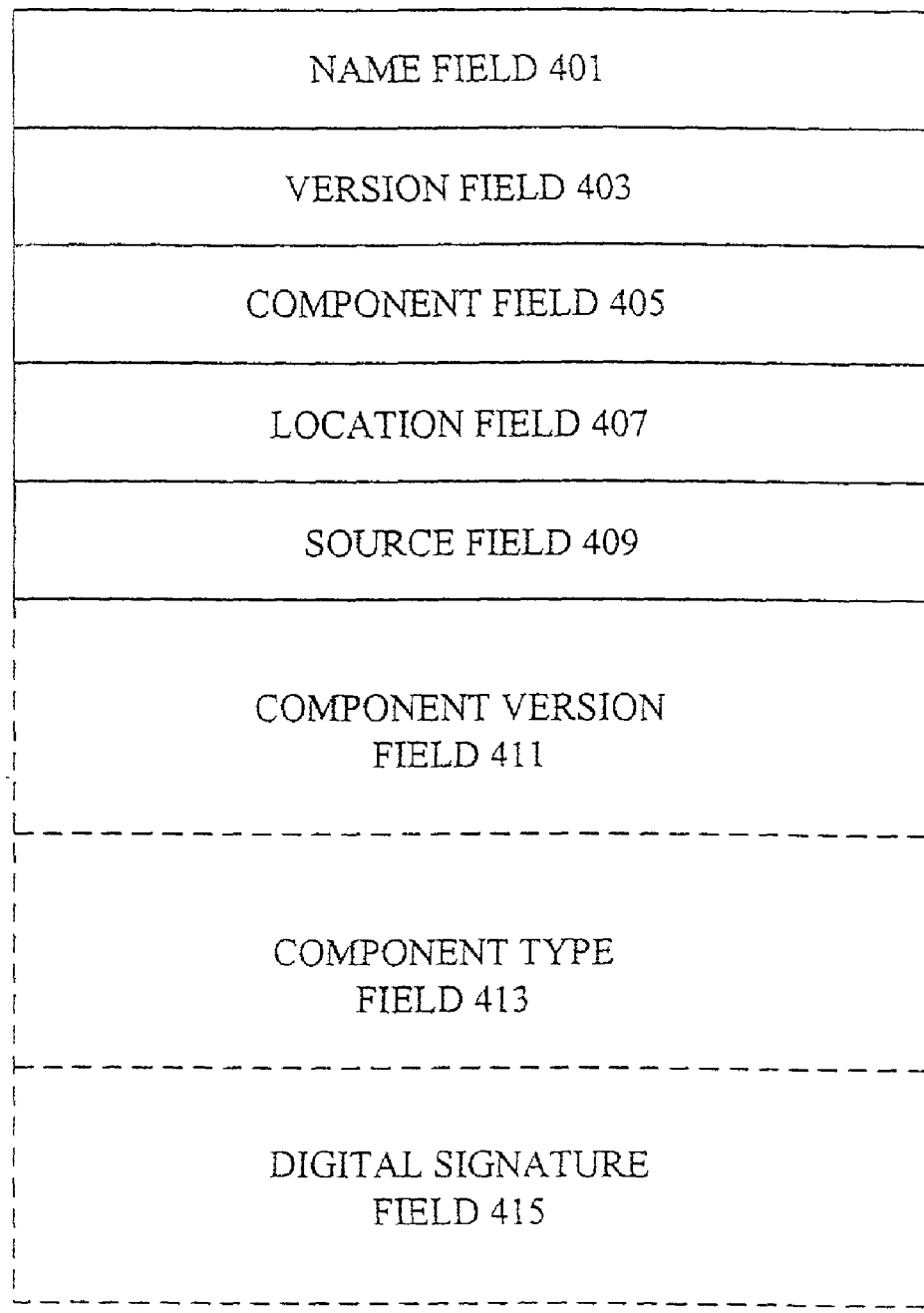
FIG. 4 is a diagram of an exemplary embodiment of an entry in a code store data structure suitable for use by the methods shown in FIGS. 3A, 3B and 3C.

FIG. 4 illustrates an exemplary embodiment of an entry in the code store data structure 400 suitable for use by the methods of the exemplary embodiments of the package manager described above. Each entry contains, at a minimum, five fields: a name field 401 for the distribution unit, a version field 403 for the distribution unit, a component field 405 that contains a list of the components in the distribution unit, a location field 407 that contains the location of the components on the client computer, and a source field 409 that contains a pointer to the source of the distribution unit, such as a URL for a downloaded distribution unit. If a component is a platform-specific ("native code") file, such as a Microsoft Windows DLL, the file name is stored in the component field. If a component is a package of Java classes, the component field contains the name of the Java package. In the case of a Java package, the code store entry has the following additional fields: a component version field 411 (which may be different from the version of the distribution unit; both are used by the package manager in resolving version dependencies), and a component type field 413 that indicates what type of Java classes the package contains, i.e., system, application, etc., both shown in phantom in FIG. 4. An optional data signature field 415, also shown in phantom, contains a digital signature affixed to the distribution unit, if it was signed. As will be familiar to one of skill in the art, the digital signature itself can contain security attributes about the package. The security attributes can be used by the package manager to prevent versions updates from a source other than the signer. Furthermore, a vendor may include software packages from third parties as dependencies in the distribution unit and the package manager uses the digital signatures on each dependent package to direct the corresponding components into different local direct ones.

In one embodiment of the code store data structure implemented in the Microsoft Windows environment, the system registry file is used as the repository for the code store entries and the package manager accesses the entries through the standard registry interface provided by the operating system.

SUMMARY

The particular methods performed by the package manager of an exemplary embodiment of the invention have been described. The method performed by the package has been shown by reference to flowcharts including the steps from 300 to 355 during installation of a software package, the steps 370 to 375 during execution of a software package, and steps 380–385 during uninstallation of a software package. Additionally, an exemplary embodiment of a code store data structure has been described.

Open Software Description Implementation

In this section of the detailed description, a particular implementation of the invention is described that formats the manifest file using an Open Software Description (OSD) format. OSD specifies a vocabulary used for describing software packages and their dependencies for client computers which is a subset of the Extensible Markup Language (XML). XML is similar to the Hypertext Markup Language (HTML) used to write Web pages and provides a general method of representing structured data in the form of lexical trees. Using the XML model, markup tags in the OSD vocabulary are represented as elements of a tree. The three basic relationships between elements are "parent-of," "child-of," and "sibling-of." Distant relationships can be formed from recursive applications of the three basic ones. The basic XML elements that compose the OSD format are shown in Table 1 below. Additional information on the OSD vocabulary can be found in the *Specification for the Open Software Description (OSD) Format* published on Aug. 11, 1997, and available for download from either Microsoft Corporation or Marimba, Inc.

TABLE 1

| Element | ABSTRACT |
|---|---|
| Content | <string> |
| Child of | SOFTPKG |
| Element | CODEBASE |
| Attributes | SIZE=<max-KB> -- the maximum allowable size for the software archive file. "Kilobytes" is the unit of measure. If SIZE is exceeded, then the software will not be downloaded.<br>HREF=<URL> -- points to the archive to be downloaded.<br>FILENAME=<string> -- specifies a file contained within the same archive as the OSD. If the OSD is used as a stand-alone file, then this attribute is ignored. |
| Child of | IMPLEMENTATION |
| Element | DEPENDENCY |
| Attributes | ACTION= (Assert | Install) -- Assert means: Ignore this SOFTPKG entirely if the dependency is not already present on the client's machine. Install means: If the dependency is not already present on the client's machine, go get it, then install it, so that the SOFTPKG has all the pieces it needs. |
| Child of | SOFTPKG, IMPLEMENTATION |
| Parent of | SOFTPKG |
| Element | DISKSIZE |
| Attributes | VALUE=<KB-number> -- approximate minimum number of bytes of disk space required by this implementation. "Kilobytes" is the unit of measure. |
| Child of | IMPLEMENTATION |
| Element | IMPLEMENTATION |
| Attributes | None Supported |
| Child of | SOFTPKG |
| Parent of | CODEBASE, DEPENDENCY, DISKSIZE, IMPLTYPE, LANGUAGE, OS, PROCESSOR, VM |
| Element | IMPLTYPE |
| Attribute | VALUE=<string> -- the type of the implementation. |
| Child of | IMPLEMENTATION |
| Element | LANGUAGE |
| Attributes | VALUE= <string> -- uses language codes as specified in ISO 639. |
| Child of | IMPLEMENTATION |
| Element | LICENSE |
| Attributes | HREF |
| Child of | SOFTPKG |
| Element | MEMSIZE |
| Attributes | VALUE = <KB-number> approximate minimum number of bytes of memory required by this implementation during execution. "Kilobytes" is the unit of measure. |
| Child of | IMPLEMENTATION |
| Element | OS |
| Attributes | VALUE= <string> -- see Appendix B for a list of possible values. |
| Child of | IMPLEMENTATION |
| Element | OSVERSION |
| Attributes | VALUE=<string> |
| Child of | OS |
| Element | PROCESSOR |
| Attributes | VALUE= <string> -- see Appendix B for a list of possible values. |
| Child of | IMPLEMENTATION |
| Element | SOFTPKG |
| Attributes | HREF -- indicates the Web page associated with a software distribution. Optional.<br>NAME=<string> -- the name of the distribution. For a given SOFTPKG, this attribute should be a unique identifier. The client can use NAME to distinguish one SOFTPKG from all others. A software package's "friendly-name" is specified by using the TITLE element.<br>VERSION=<string> |
| Child of | DEPENDENCY |
| Parent of | ABSTRACT, CODEBASE, IMPLEMENTATION, DEPENDENCY, TITLE |
| Element | TITLE |
| Content | <string> |
| Child of | SOFTPKG |
| Element | VM |
| Attributes | VALUE |
| Child of | IMPLEMENTATION |

The OSD vocabulary can be used in a stand-alone XML manifest file to declare the dependencies between different software components for different operating systems and languages. The OSD file provides instructions that can be used to locate and install only the required software components depending on the configuration of the target machine and what software is already present. The OSD formatted manifest file also can be embedded in an archive file, such as a Java Archive (.JAR) file, or a composite, compressed file, such as a cabinet (.CAB) file, that contains the component's distribution unit to form a distribution unit file.

Additionally, the manifest file can specify an XML tag, "namespace," that causes the package manager to isolate software packages from one another even if the same component is used by multiple packages:

<JAVA>

. . .

<NameSpace>Fred's Software Company</NameSpace>

Thus the use of namespaces avoids version mismatches among software packages.

A namespace is analogous to a directory in a file system, such as implemented in the Windows family of operating systems, in that installing applications in different directories provides isolation for the applications. Previously a namespace was global to all applications installed on a system so that all files and components in the namespace were accessible by the applications. The global nature of previous namespaces presents difficulties in naming files and components because an application programmer has to avoid common names to prevent potential conflicts with identically named files and components for another application installed in the same namespace. Installing the second of the two applications would likely cause one or both applications to fail, just as placing all files for all applications installed on a computer into a single directory frequently causes conflicts between the applications.

In the present invention, the presence of a namespace XML tag in the manifest file causes the package manager to associate the files and components of the corresponding application in the code store data structure with the unique namespace specified in the tag. When an application is executed, the package manager passes the associated namespace name to the computer's runtime environment so that any files and components installed in that namespace are visible to the application while files and components installed in other namespaces are not. Using the example XML tag above, Fred's CoolestApp is associated with a namespace called "Fred's Software Company," would execute in the "Fred's Software Company" namespace, and have access to any files or components installed in the "Fred's Software Company" namespace. Similarly, an XML tag for Bob's identically named "CoolestApp" would specify "Bob's Software Company" as the namespace, execute in the "Bob's Software Company" namespace, and have access to any files or components installed in the "Bob's Software Company" namespace. Neither Bob's CoolestApp nor Fred's CoolestApp can access a common component or file installed in the other's namespace. Therefore, because of the isolation that namespaces provide, both Fred and Bob are assured their applications will function correctly even though identically named and having common components or files, and that the applications will continue to function correctly irregardless of the number of CoolestApps using the same components or file which may be installed on the computer.

distribution unit at http://www.fsc.com/coolestapp.osd. The corresponding distribution unit is stored in a cabinet file at http://www.fsc.org/coolestapp.cab. The CoolestApp's dependency on the components of the earlier CoolApp is indicated with a "DEPENDENCY" tag and refers the package manager to the CoolApp manifest file at http://www.fsc.org/coolapp.osd (not shown). The CoolApp manifest file directs the package manager to the location of the distribution unit for the CoolApp.

```
<SOFTPKG NAME="com.fsc.www.coolestapp" VERSION="1,0,0,0">
    <TITLE>CoolestApp</TITLE>
    <ABSTRACT>CoolestApp by Fred's
    Software Company</ABSTRACT>
    <LICENSE HREF="http://www.fsc.com/
    coolestapp/license.html"/>
    <!—FSC's CoolestApp is implemented in native code -->
    <IMPLEMENTATION>
        <OS VALUE="WinNT"><OSVERSION
        VALUE="4,0,0,0"/></OS>
        <OS VALUE="Win95"/>
        <PROCESSOR VALUE="x86"/>
        <LANGUAGE VALUE="en"/>
        <CODEBASE HREF="http://www.fsc.org/coolestapp.cab"/>
        <!—CoolestApp needs CoolerApp -->
        <DEPENDENCY>
            <CODEBASE HREF="http://www.fsc.org/
            coolapp.osd"/>
        </DEPENDENCY>
    </IMPLEMENTATION>
</SOFTPKG>
```

Had the CoolApp manifest file been stored in a cabinet distribution unit file along with the CoolApp components, the location of the distribution unit file would have been http://www.fsc.org/coolapp.cab.

In a second exemplary embodiment of the invention for purposes of this section, components contained in a distribution unit file are caused to be installed by OSD tags embedded on a Web page. If Fred's Software Company's Web page requires additional software to be downloaded and installed for viewing the page, FSC can use the OSD vocabulary within HTML commands to have the user's browser download the necessary components as shown in the two examples below.

```
<OBJECT CLASSID="clsid:9DBAFCCF-592F-101B-85CE-00608CEC297B"
VERSION="1,0,0,0"
CODEBASE="http://www.fsc.com/coolestapp.osd"
HEIGHT=100 WIDTH=200 >
</OBJECT>
-or-
<APPLET code=myapplet.class id=coolestapp width=320 height=240>
    <PARAM NAME=useslibrary VALUE="coolestapp">
    <PARAM NAME=useslibraryversion VALUE="1,0,0,0">
    <PARAM NAME=useslibrarycodebase VALUE="http://www.fsc.com/coolestapp.osd
">
</APPLET>
```

Continuing with the distribution of Fred's Software Company's CoolestApp, the manifest file in a first exemplary embodiment in this section is stored separately from the The HTML <OBJECT> or <APPLET> tag informs an OSD-aware client browser, such as Microsoft Explorer 4, that there is additional software required to view the Web page. The browser invokes the package manager to execute the software package if it is already installed or to install it if not. If not already installed, the package manager instructs the browser to download the distribution file unit and proceeds with the installation as described in the previous section. The "CODEBASE" element in <OBJECT> and the "useslibrarycodebase" tag in <APPLET> can point to the manifest file or to the distribution unit file.

In a third exemplary embodiment of the invention for purposes of this section, a distribution unit file is used to automatically distribute software from Fred's Software Company's server to the user's computer. This automatic distribution across a network employs "channels" to which the user subscribes to automatically "push" software components through a client agent such as a browser. The channel is described using a Channel Definition Format (CDF) which is also based on XML. A CDF file uses the OSD elements to inform a CDF-aware client agent as to what software components should be downloaded and installed.

```
<CHANNEL HREF="http://www.fsc.com.intropage.htm">
    <SELF="http://www.fsc.com/software.cdf"/>
    <TITLE>A Software Distribution Channel</TITLE>
    <SOFTPKG
        HREF="http://www.fsc.com/aboutsoftware.htm"
        AUTOINSTALL="yes"
        NAME="{D27CDB6E-AE6D-11CF-96B8-444553540000}"
        VERSION="1,0,0,0">
        <IMPLEMENTATION>
            <OS VALUE="WinNT"><OSVERSION
            VALUE="4,0,0,0"/></OS>
            <OS VALUE="Win95"/>
            <PROCESSOR VALUE="x86"/>
            <CODEBASE HREF="http://www.fsc.com/
            coolestapp.cab"/>
        </IMPLEMENTATION>
    </SOFTPKG>
</CHANNEL>
```

This section has described a particular implementation of the package manager which is directed to install software by OSD elements embedded in an XML document. The processing of a manifest file described in previous section when written as XML document is described. In addition, alternate embodiments in which a separate XML document resides on a Web page to direct a browser to invoke the package manager to install a software package is also described in this section.

CONCLUSION

A software package manager has been described which manages the installation, execution and uninstallation of software packages acquired through various media. The software manager uses a manifest file, a distribution unit, and a code store data structure to accomplish its functions. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that the file and data structures described herein can be easily adapted to future distribution media. Furthermore, those of ordinary skill within the art will appreciate that future extensible languages which are platform and operating system independent can be used to direct the software package managers actions.

The terminology used in this application is meant to include all hardware and software platforms. Therefore, it is manifestly intended that this invention be limited only by the following claims and equivalents thereof.

We claim:

1. In a computer, a method of processing one or more software dependencies, the method comprising:
   for one or more of the software dependencies, determining whether software associated with the software dependency is present on the computer;
   responsive to determining the software associated with the software dependency is not present on the computer, acquiring, by a software package manager running on the computer, the software associated with the software dependency;
   after acquiring the software associated with the software dependency, updating a database at the computer indicating the software associated with the software dependency is installed on the computer;
   wherein at least one of the software dependencies specifies a plurality of software items forming a software package, wherein the software package comprises a mixture of native code components and platform-independent code components;
   wherein at least one of the software dependencies refers to a list comprising one or more other software dependencies; and
   wherein the acquiring the software associated with the software dependency comprises recursively processing the one or more other software dependencies.

2. The method of claim 1 wherein acquiring the software associated with the software dependency comprises acquiring a file comprising the list comprising one or more other software dependencies.

3. The method of claim 1 wherein acquiring the software associated with the software dependency comprises acquiring a list of one or more files from a remote location and acquiring the files in the list.

4. The method of claim 1 wherein one or more of the software dependencies is associated with a location whereat the list of other software dependencies can be found.

5. The method of claim 1 wherein the database is operable to indicate whether a plurality of software components are installed via a single name associated with the plurality of software components.

6. The method of claim 1 wherein the database is operable to indicate whether a plurality of software dependencies are installed via a single name associated with the plurality of software dependencies.

7. The method of claim 1 wherein:
   one or more dependencies in the list of software dependencies is associated with a version number; and
   determining the dependency is not present on the computer comprises determining software satisfying the version number is not present on the computer.

8. The method of claim 7 wherein at least two software dependencies are associated with different version numbers.

9. The method of claim 1 wherein acquiring dependencies is deferred until execution of software associated with the dependencies is requested.

10. The method of claim 1 further comprising:
    after acquiring the software associated with the software dependency, installing the software.

11. The method of claim 1, further comprising:
after processing the one or more software dependencies, uninstalling the software associated with the one or more software dependencies based on the database.

12. The method of claim 1 wherein the mixture of native code components and platform-independent code components are grouped together in a distribution unit.

13. A computer-readable storage medium comprising computer-executable instructions for performing at least the following to process one or more software dependencies in a computer:
for one or more of the software dependencies, determining whether software associated with the software dependency is present on the computer;
responsive to determining the software associated with the software dependency is not present on the computer, acquiring, by a software package manager running on the computer, the software associated with the software dependency; and
after acquiring the software associated with the software dependency, updating a database at the computer indicating the software associated with the software dependency is installed on the computer;
wherein at least one of the software dependencies specifies a plurality of software items forming a software package, wherein the software package comprises a mixture of native code components and platform-independent code components;
wherein at least one of the software dependencies refers to a list comprising one or more other software dependencies; and
wherein the acquiring the software associated with the software dependency comprises recursively processing the one or more other software dependencies.

14. In a computer, a method of specifying a software dependency, the method comprising:
specifying a name of the software dependency, wherein the name is operable to identify a list of one or more other software dependencies;
specifying a version of the software dependency;
comparing the version for the software dependency against a version of software installed at the computer; and
responsive to determining the version installed at the computer is not sufficient, acquiring and installing, by a software package manager running on the computer, the software dependency, wherein the acquiring and installing the software dependency comprises recursively specifying the one or more other software dependencies;
wherein the name of the software dependency is associated with a software package comprising a plurality of software components, wherein the plurality of software components comprises a mixture of native code components and platform-independent code components.

15. The method of claim 14 wherein the software dependency is associated with a software package depending on at least one other software package.

16. In a computer, a method of processing a name designating software, the method comprising:
consulting a database to see if software associated with the name is already installed at the computer;
responsive to determining software associated with the name is not already installed at the computer, acquiring, by a software package manager running on the computer, the specified software; and
responsive to determining software dependencies associated with the specified software are not already installed at the computer, acquiring, by the software package manager running on the computer, the software dependencies;
wherein the name is operable to specify a plurality of software components, wherein the name is associated with a software package comprising the plurality of software components, wherein the plurality of software components comprises a mixture of native code components and platform-independent code components, and wherein acquiring the specified software comprises recursively processing software dependencies associated with the name to find one or more other software dependencies associated with names designating software.

17. The method of claim 16 wherein the plurality of software components is divided among a plurality of files.

18. The method of claim 16 wherein the plurality of software components comprises a plurality of files.

19. The method of claim 16 wherein
the name is operable to specify a plurality of different software components; and
different versions are associated with the different software components.

20. The method of claim 16 wherein the name is operable to specify a list of one or more software dependencies, the method further comprising:
for at least one software dependencies, determining software associated with the dependency is already installed at the computer, wherein the dependency specifies a plurality of software components.

21. The method of claim 16 wherein acquiring the specified software comprises identifying an other name associated with a plurality of software components, and acquiring the plurality of software components associated with the other name.

* * * * *